Nov. 17, 1959  L. SILVERMAN  2,913,232
GAS TREATING DEVICE
Filed Aug. 29, 1956
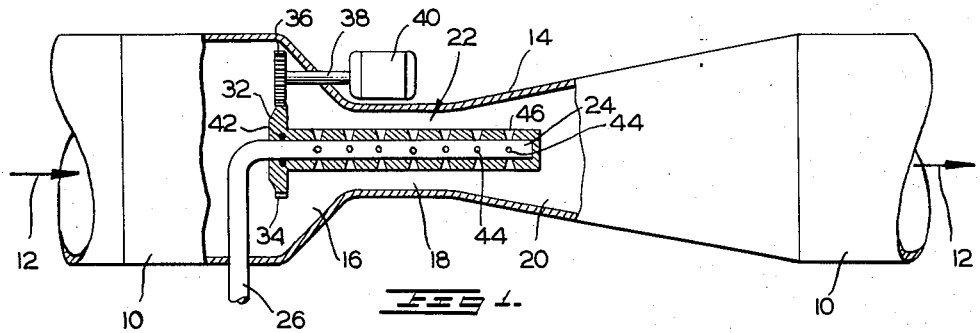
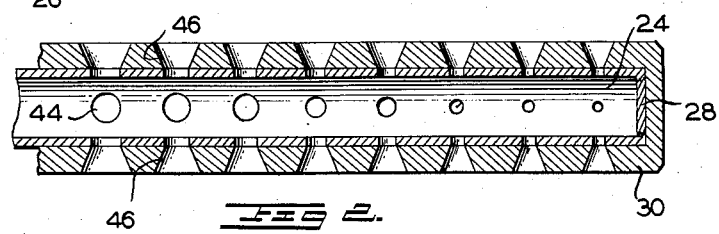
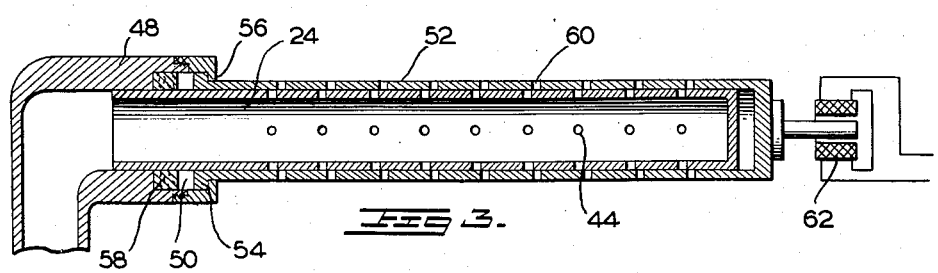
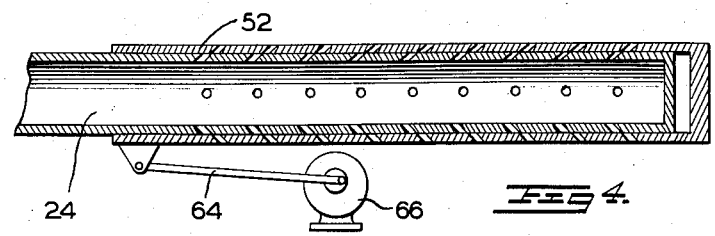
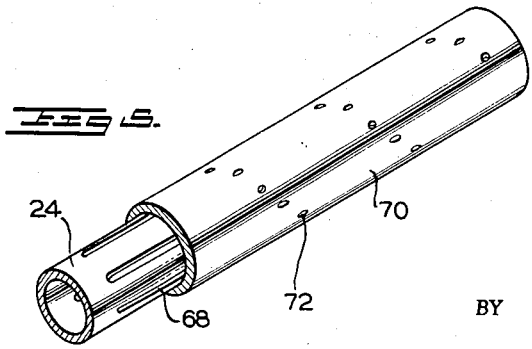
INVENTOR
LESLIE SILVERMAN
BY *Harold T. Stowell*
ATTORNEY

United States Patent Office 2,913,232
Patented Nov. 17, 1959

2,913,232
GAS TREATING DEVICE

Leslie Silverman, Dover, Mass., assignor to Research-Cottrell, Inc., Bridgewater Township, Somerset County, N.J., a corporation of New Jersey Application August 29, 1956, Serial No. 606,907

3 Claims. (Cl. 261—40)

The present invention relates to gas treating methods and apparatus and more particularly to methods and apparatus for introducing liquid into a gas stream from which finely suspended particles are to be removed or for humidification of the gas stream.

Prior liquid injecting structures have served to increase the efficiency of gas cleaning apparatus to a limited degree but they have failed to achieve maximum efficiency because they have lacked means for properly controlling the liquid injection in accordance with certain critical factors incident to the characteristics of the particular gas flow to be treated.

It is therefore a general object of this invention to provide new and greatly improved methods and apparatus for introducing liquid into a flowing gas stream to obtain maximum efficiency in the separation of suspended particles from said gas stream, or for humidification thereof.

Another object of this invention is to provide novel and improved apparatus for the introduction of liquid into a flowing gas stream which enables precise and automatic control of the character of the liquid injected over a wide range of velocities and droplet diameters from a sheet spray to an aerosol mist.

A further object of this invention is the provision of liquid injection apparatus for introducing liquid droplets into a flowing gas stream over substantial areas axially of the stream which permits control of the liquid characteristic to provide for variation in liquid droplet diameters throughout the length of said axial area of the gas stream to be treated.

Still another object of this invention resides in the provision of new and improved apparatus for introducing liquid into a flowing gas stream which contemplates the incorporation of a mixing or tubulence device within the gas stream within the area of which the liquid injection occurs for achievement of maximum saturation and contact of suspended particles in said flowing gas.

A still further object is the provision of apparatus for introducing liquid into a flowing gas stream which provides a pattern of liquid injection substantially radially of the stream producing maximum contact with and saturation of suspended particles within said stream by said liquid.

Another and still further object of this invention relates to a new and improved method of treating gas by the introduction of a liquid spray through a substantial axial portion of the gas stream in a controlled pattern.

Still further objects and advantages of this invention will become more readily apparent to those skilled in the art when the following description is read in the light of the appended drawings.

The nature of the present invention may be stated in general terms as relating to apparatus for treating gas which includes in a flowing gas stream a mixing or turbulence area such as a Venturi section extending axially of a portion of the gas stream, a source of liquid under pressure, an elongated spray member mounted to extend axially of said gas stream coaxially within said mixing section, and control means for varying the characteristics of the liquid droplets injected by said spray member throughout its length; and a method for treating gas including the introduction of liquid thereinto in a controlled pattern and of a controlled droplet characteristic whereby maximum contact is provided between said liquid and said gas.

Referring now to the accompanying drawings in which like numerals designate similar parts throughout the several views:

Fig. 1 is a side elevation in partial vertical section illustrating the principal embodiment of the present invention.

Fig. 2 is an enlarged fragmentary vertical section illustrating the spray nozzle construction.

Fig. 3 is a vertical section illustrating a modified nozzle construction.

Fig. 4 is a vertical section similar to Fig. 3 illustrating a modified control means for the nozzle construction of Fig. 3.

Fig. 5 is a perspective view of a further modification of the spray nozzle construction.

The present invention is disclosed and described hereinafter in an embodiment adapted for incorporation in a gas or air scrubbing unit for purposes of illustration and clarity of understanding, it being further contemplated that apparatus and methods constituting the essence of the present invention may be advantageously utilized in substantially any device or apparatus wherein it is desirable to provide for the contact of a gaseous medium by a fluid spray or mist, such as a humidifier, air conditioner, gas cleaner or the like.

The apparatus for carrying out the present invention includes a gas duct 10 into which gases to be treated are introduced under the influence of a blower or the like to flow therethrough in the direction indicated by arrows 12. A Venturi section, generally designated at 14, is formed within the duct 10 and includes a constricted area 16, a throat portion 18 and an expansion area 20. The angularity of the constriction and expansion sections may be precalculated to afford desired characteristics of acceleration and turbulence, respectively, of the gas flow through the duct. A wash liquid nozzle, generally designated at 22, is located within the Venturi section for introducing wash liquid into the gas stream to provide for example the agglomeration of suspended particles in the gas to facilitate their separation from the gas by subsequent treating apparatus such as, for example, a cyclone collector (not shown).

The invention embodiment disclosed in Figs. 1 and 2 of the drawings provides for a wash liquid nozzle taking the form of an elongated pipe 24 mounted coaxially within the throat portion 18 of the Venturi section with one end thereof extending for a spaced distance into the expansion portion of the Venturi. The rearward or second end of the pipe in the direction of gas entry into the Venturi is provided with a right angular extension 26 which communicates through the duct wall with a source (not shown) of a liquid under pressure. The extended end of the pipe within the expansion portion of the Venturi is closed by a plug member 28.

Associated with the pipe 24 is a tubular sleeve 30 having one open end which is telescopically placed over the plugged pipe end to enclose substantially the entire length of said pipe. The open end of the sleeve 30 is provided with an angular flange 32 having a gear rack 34 formed peripherally thereabout. The gear rack 34 is in meshed engagement with a drive gear 36 driven by drive shaft 38 from a controlled motor 40 located externally of the duct. Operation of the motor 40 will produce rotation of the sleeve 30 relative to the fixed pipe 24. The sleeve 30 is provided in the inner wall thereof with O-ring bearing seals 42 adjacent the open end thereof to maintain a liquid seal within the sleeve.

The pipe 24 is provided throughout its enclosed length within the sleeve 30 with longitudinally spaced orifices 44 which are arranged in diametrically opposed pairs lengthwise of the pipe. The sleeve 30 is provided with orifices 46 in longitudinally spaced relationship throughout its length, said orifices likewise being arranged in diametrically opposed pairs with each pair of sleeve orifices 46 being located in association with each pair of pipe orifices 44.

From the foregoing disclosure it is readily seen that rotation of the sleeve 30 relative to the pipe 24 will bring about intermittent registry of sleeve orifices 46 with pipe orifices 44 to provide for intermittent fluid jets being introduced into the gas stream within the throat and expansion areas of the Venturi section. Further, reference to Fig. 2 will illustrate that it is contemplated to provide for progressively decreasing orifice diameters in both the pipe 24 and sleeve 30 in the direction of gas flow to provide a controlled and specific spray pattern within the gas stream whereupon finer, smaller diameter liquid droplets will be injected into the gas stream as the gas expands and its turbulence increases within the expansion area of the Venturi. Similar results may be obtained by providing progressively decreasing orifices in the outer sleeve only.

Reference to Fig. 3 of the drawings will illustrate a modification of the spray nozzle wherein the pipe 24 is provided with a supporting collar 48 about the rearward end thereof with said collar having a packing gland 50 threadedly secured concentrically about the outer circumference of that end of the pipe secured within said collar. A sleeve 52 is telescopically received over said pipe with the open end of said sleeve having a short annular flange 54 located within the packing gland 50 and retained against longitudinal displacement therefrom by an annular lip 56 formed about the open end of the gland. A packing ring 58 may be positioned within the gland at the inner extremity thereof and at a spaced distance from the open end of said sleeve allowing for limited reciprocal movement of said sleeve within said gland between said packing and said retaining lip 56 thereon.

In this latter embodiment of the present invention the pipe 24 is provided as before with spaced pairs of orifices 44 throughout its length and said sleeve 52 is provided with corresponding pairs of orifices 60 throughout its length. In association with the extended end of the sleeve is a solenoid 62 which is operable to bring about the reciprocation of the sleeve relative to the pipe to bring the sleeve orifices 60 into and out of registry with the pipe orifices 44 to control fluid injection into the gas stream within the Venturi section. Again, in this modification it is contemplated that the diameters of said orifices 44 and 60 can vary from one end of the nozzle to the other to provide desired fluid jet and droplet characteristics.

It is also fully contemplated that said orifices 44 and 60 may be varied from true radial opening to provide for slight angular discharge of the fluid in the direction of the gas flow within the Venturi section to induce the gas flow by liquid entrainment therewith without reducing the efficiency of liquid contact with suspended particles in said flowing gas as shown in Fig. 4.

The modification of the spray nozzle control means illustrated in Fig. 4 of the drawings provides for a substitution of a crank arm 64 secured to the sleeve 52 and driven eccentrically from a motor 66 for the solenoid structure 62 to provide for the reciprocal movement of the sleeve relative to the fixed pipe 24.

Fig. 5 of the drawings discloses and illustrates a modified construction of the spray nozzle wherein the pipe 24 is provided with longitudinally extending parallel slotted openings 68 arranged in radially spaced relationship thereabout and extending for a substantial length of said pipe intermediate the ends thereof. A sleeve 70 telescopically associated with the pipe is provided with a series of liquid orifices 72 which are formed in said sleeve in one or more continuous helical patterns from the end thereof throughout substantially the entire length of the sleeve.

By providing the sleeve 70 of the last described embodiment with a rotary drive means such as disclosed in Fig. 1, liquid jets will be introduced into the Venturi section in a helical pattern progressing from the throat section through the expansion area of the Venturi thereby inducing gas flow through the Venturi by the progressively moving action of the injected liquid. It is also contemplated in this embodiment that the diameters of the orifice openings 72 may be varied from one end of the sleeve to the other to provide controlled liquid droplet characteristics relative to the increasing gas saturation within the expansion area of the Venturi section.

From the foregoing disclosure it may be seen that it is possible to provide with the apparatus described positively controlled liquid injection characteristics ranging from large drops to aerosol mist sprays throughout a substantial length of the Venturi section. It is also seen that the liquid injection pattern may be established so as to provide with radial injection into the gas stream an inducement of gas flow through angular entrainment of the liquid with the gas in the direction of its flow through the Venturi section.

It is to be further noted that operation of the apparatus hereinbefore described will through the action of the liquid injection provide in addition to induced axial gas flow a centrifugation of the gas flow through the Venturi section greatly increasing the efficiency of contact of the liquid and the gas stream resulting in improved humidification of the gas stream.

Thus, from the foregoing description and disclosures it is seen that new and improved gas treating apparatus has been provided which serves to facilitate the performance of a new and improved method of treating gases by the introduction of liquid thereinto in a controllable pattern and with controllable spray characteristics.

Accordingly, new and improved methods and apparatus for the treatment of gases have been disclosed which accomplish and attain all of those objects and advantages heretofore set forth and what is desired to be claimed is:

1. Apparatus for dispersing in droplet form a gas treating fluid into a flowing gas stream to be treated comprising an elongated pipe supported coaxially within a gas stream to be treated and having communication with a source of treating fluid under pressure, a plurality of fluid outlet openings arranged in spaced relationship lengthwise of said elongated pipe, a tubular sleeve telescopically enclosing said tubular pipe, fluid openings formed in said tubular sleeve in spaced relationship for intermittent registry with said elongated pipe outlet openings upon relative movement between said tubular sleeve and said elongated pipe, a continuously operating motor, means connecting said motor to said tubular sleeve to bring about continuous relative movement between the tubular sleeve and the elongated pipe whereby the openings in said pipe cooperate with the openings in said tubular sleeve to disperse in droplet form the liquid under pressure flowing through the openings in said elongated pipe and the openings in said sleeve.

2. The invention defined in claim 1 wherein said motor and said means connecting said motor to said tubular sleeve cooperate to reciprocate the tubular sleeve relative to said elongated pipe.

3. The invention defined in claim 1 wherein said motor and said means connecting said motor to said tubular sleeve cooperate to rotate said tubular sleeve about said elongated pipe.

References Cited in the file of this patent

UNITED STATES PATENTS

| | | |
|---|---|---|
| 1,153,077 | Hippel | Sept. 7, 1915 |
| 1,376,156 | Murphy | Apr. 26, 1921 |
| 2,633,341 | Reistad | Mar. 31, 1953 |
| 2,713,476 | Steichen | July 19, 1955 |

FOREIGN PATENTS

| | | |
|---|---|---|
| 10,510 | Great Britain | Aug. 16, 1906 |
| 15,795 | Great Britain | July 19, 1899 |
| 551,898 | Germany | June 6, 1932 |